United States Patent
Kramer (10) Patent No.: US 12,188,393 B2
(45) Date of Patent: Jan. 7, 2025

(54) EXHAUST SYSTEM HAVING A HANGER ASSEMBLY

(71) Applicant: TENNECO AUTOMOTIVE OPERATING COMPANY INC., Lake Forest, IL (US)

(72) Inventor: Joseph R. Kramer, Dexter, MI (US)

(73) Assignee: Tenneco Automotive Operating Company Inc., Lake Forest, IL (US)

( * ) Notice: Subject to any disclaimer, the term of this patent is extended or adjusted under 35 U.S.C. 154(b) by 136 days.

(21) Appl. No.: 17/866,778

(22) Filed: Jul. 18, 2022

(65) Prior Publication Data

US 2024/0018892 A1 Jan. 18, 2024

(51) Int. Cl.
*F01N 13/18* (2010.01)
*B60K 13/04* (2006.01)

(52) U.S. Cl.
CPC .......... *F01N 13/1822* (2013.01); *B60K 13/04* (2013.01)

(58) Field of Classification Search
CPC .. F01N 13/1805; F01N 13/10; F01N 13/1822; F01N 13/1838; F16L 3/02; B60K 13/04
See application file for complete search history.

(56) References Cited

U.S. PATENT DOCUMENTS

| | | | |
|---|---|---|---|
| 5,472,162 A | 12/1995 | Mason | |
| 7,571,880 B2 * | 8/2009 | Perez | F01N 13/1822 248/65 |
| 10,436,099 B2 | 10/2019 | Shende | |
| 11,199,121 B2 | 12/2021 | Sawanishi et al. | |
| 11,821,348 B1 * | 11/2023 | Verseman | F01N 13/1822 |
| 2007/0246615 A1 | 10/2007 | Maache et al. | |
| 2017/0211458 A1 * | 7/2017 | Rodecker | F16L 55/035 |
| 2018/0291794 A1 * | 10/2018 | Hill | B60K 13/04 |
| 2020/0056531 A1 * | 2/2020 | Rodecker | F16F 1/3842 |
| 2020/0224577 A1 * | 7/2020 | Sawanishi | F01N 13/1872 |
| 2024/0025704 A1 * | 1/2024 | Tan | B66C 13/085 |

FOREIGN PATENT DOCUMENTS

| | | |
|---|---|---|
| CN | 206376931 U | 8/2017 |
| CN | 108528204 A | 9/2018 |
| CN | 106988849 B | 11/2019 |
| CN | 210234651 U | 4/2020 |
| CN | 211258770 U | 8/2020 |
| CN | 211343087 U | 8/2020 |
| CN | 214396400 U | 10/2021 |
| DE | 112016001588 T5 | 12/2017 |
| EP | 1756404 B1 | 8/2009 |
| EP | 2147815 B1 | 12/2010 |
| EP | 2429848 B1 | 8/2015 |
| JP | 3770093 B2 | 4/2006 |

(Continued)

*Primary Examiner* — Anthony Ayala Delgado
(74) *Attorney, Agent, or Firm* — McGarry Bair PC (57) ABSTRACT

An exhaust system having an exhaust manifold, and a hanger assembly. The hanger assembly is coupled to the exhaust manifold. The hanger assembly includes a rod, a flange and a fin. The flange includes a slot, an interior, an upper face and a lower face. The lower face is spaced from the upper face, and is couplable to a respective portion of the exhaust manifold. The fin is operably coupled to the rod. The fin is at least partially received within the slot and extends through at least a portion of the interior.

20 Claims, 9 Drawing Sheets

(56) References Cited

FOREIGN PATENT DOCUMENTS

| | | | |
|---|---|---|---|
| JP | 2006132512 | A | 5/2006 |
| JP | 4035319 | B2 | 1/2008 |
| JP | 2008037293 | A | 2/2008 |
| JP | 5568606 | B2 | 8/2014 |
| KR | 20090062295 | A | 6/2009 |
| KR | 20100011879 | A | 2/2010 |
| KR | 20110051830 | A | 5/2011 |
| KR | 101053179 | B1 | 8/2011 |
| WO | 2009118746 | A1 | 10/2009 |
| WO | 2017154206 | A1 | 9/2017 |

* cited by examiner

FIG. 9

EXHAUST SYSTEM HAVING A HANGER ASSEMBLY

TECHNICAL FIELD

The disclosure generally relates to an exhaust system, and more specifically to an exhaust system having a hanger assembly.

BACKGROUND

Many vehicles are equipped with structures identified as exhaust hanger for fixing exhaust systems to a vehicle body or frame. Some exhaust hangers include a flexible element, such as a rubber or silicone isolator. The exhaust hanger includes a straight rod extending from the flexible isolator called a perch. The perch is the loading point for the hanger assembly. The perch may be a hollow or solid rod that can be bent into required shapes. Several exhaust hangers may be distributed along the length of an exhaust, increasing cost and complexity of the system. Exhaust hangers having longer perches may suffer from poor noise, vibration and harshness (NVH) performance.

Each exhaust hanger, however, must be designed specifically for the location where it will be provided along the exhaust system. For example, some portions of the exhaust system can be further away from the frame such that a larger exhaust hanger, a longer rod, or a larger isolator are needed in order to mount the exhaust system to the frame via the exhaust hanger. As noted above, this can be difficult as a longer rod results in poor noise and poor NVH performance.

BRIEF DESCRIPTION

In one aspect, the disclosure relates to an exhaust system comprising an exhaust system comprising an exhaust manifold, and a hanger assembly operably coupled to the exhaust manifold, the hanger assembly comprising a rod defining a rod centerline, a flange having an upper face, a lower face, an interior and a slot, with the lower face being radially spaced from the upper face, with respect to the rod centerline, and being operably couplable to a respective portion of the exhaust manifold, and a fin at least partially received within the slot and extending through at least a portion of the interior, the fin being operably coupled to the rod, with at least a portion of the fin extending radially beyond the upper face of the flange and toward the rod centerline with respect to the rod centerline.

In another aspect, the disclosure relates to a hanger assembly comprising a rod, a flange spaced from the rod and having a body defining an interior, and a fin extending through at least a portion of the interior and having a leg operably coupled to the flange and a seat extending from the leg, with the seat being operably coupled to the rod.

In yet another aspect, the disclosure relates to a method of mounting an exhaust system having an exhaust manifold and a hanger assembly mounted to the exhaust manifold, the method comprising securing a flange of the hanger assembly to a corresponding portion of the exhaust manifold, the flange having a body defining an interior, securing a rod of the hanger assembly to a fin of the hanger assembly, the fin having a leg and a seat extending from the leg, and securing the leg of the fin to a corresponding portion of the flange such that the fin extends through at least a portion of the interior.

BRIEF DESCRIPTION OF THE DRAWINGS

A full and enabling disclosure of the present description, including the best mode thereof, directed to one of ordinary skill in the art, is set forth in the specification, which refers to the appended FIGS., in which.

DETAILED DESCRIPTION

Aspects of this disclosure described herein are directed toward an exhaust system having an exhaust manifold and a hanger assembly. The hanger assembly operably mounts the exhaust manifold, and hence the exhaust system, to a portion of a surrounding environment. As a non-limiting example, the exhaust system can be an exhaust system for the vehicle having a frame and the hanger assembly operably mounts the exhaust system to the frame. The hanger assembly includes a rod received within a fin. The fin is received within a slot formed within a flange. The exhaust system can be utilized within any suitable environment. As a non-limiting example, the exhaust system reservoir can be utilized within a vehicle (e.g., an automobile with an engine). It will be understood, however, that aspects of the disclosure described herein are not so limited and can have general applicability within other assemblies including an exhaust system. For example, the disclosure can have applicability for exhaust systems in other applications or vehicles, and can be used to provide benefits in industrial, commercial, and residential applications.

As used herein, the term "upstream" refers to a direction that is opposite the fluid flow direction, and the term "downstream" refers to a direction that is in the same direction as the fluid flow. Furthermore, as used herein, the term "set" or a "set of elements" can be any number of elements, including only one.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present disclosure, and do not create limitations, particularly as to the position, orientation, or use of aspects of the disclosure described herein. Connection references (e.g., attached, coupled, secured, fastened, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

Figure 1:
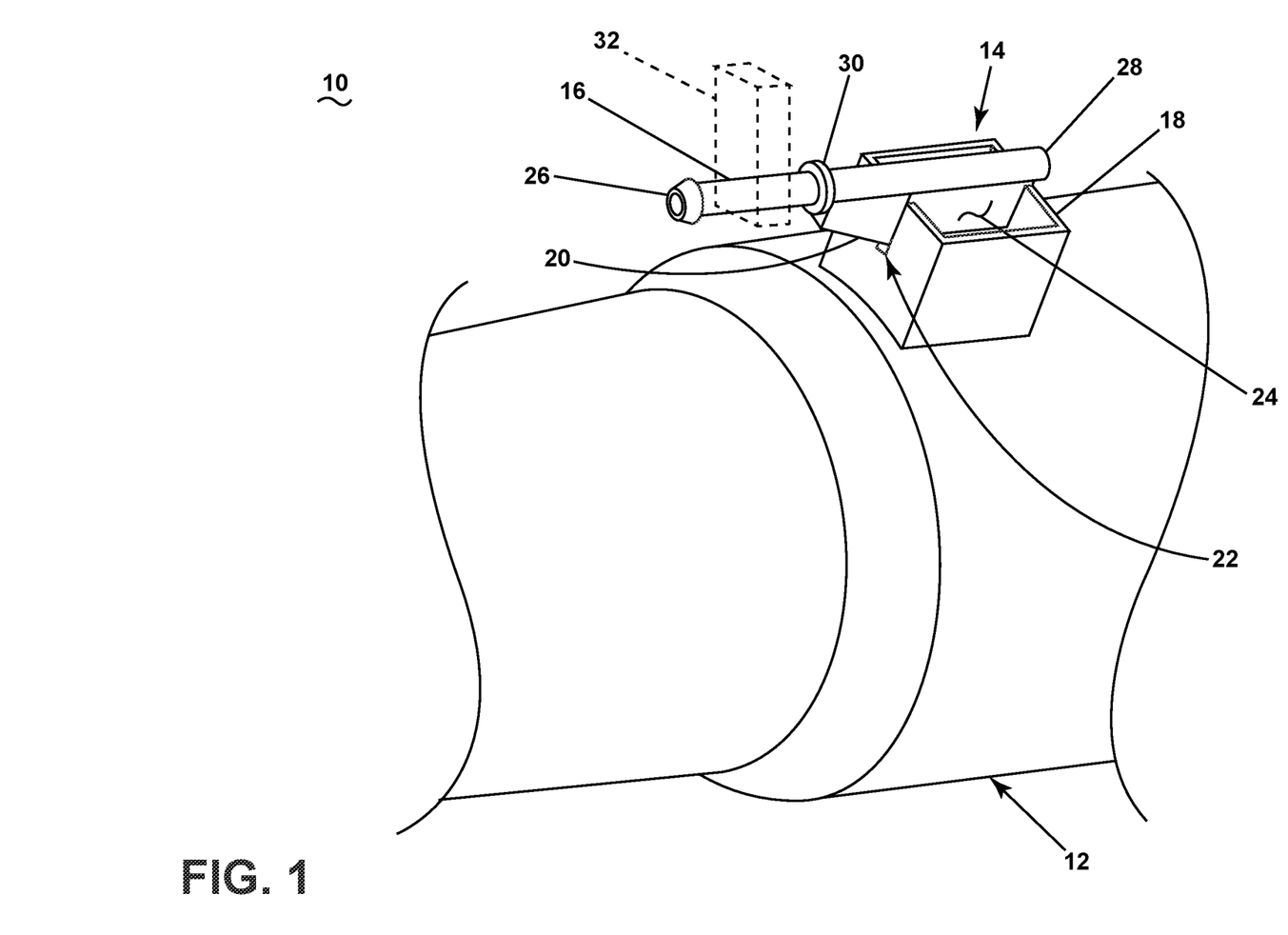
FIG. 1 is a schematic perspective view of an exhaust system comprising an exhaust manifold and a hanger assembly provided along the exhaust manifold.

FIG. 1 is a schematic perspective view of an exhaust system 10. The exhaust system 10 includes an exhaust manifold 12 and a hanger assembly 14 provided along the exhaust manifold 12. The hanger assembly 14 includes a rod 16, a flange 18, and a fin 20. The hanger assembly 14 can operably mount or couple the exhaust manifold 12, and hence the exhaust system 10, to a portion exterior the exhaust system 10 (e.g., a frame of a vehicle).

The exhaust manifold 12 can be any suitable exhaust manifold 12 fluidly coupled to an exhaust gas from an engine. In other words, the exhaust gas can flow throughs the exhaust manifold 12. As a non-limiting example, the exhaust manifold 12 can be an exhaust manifold for a vehicle that is operably coupled to the engine such that that exhaust manifold is configured to exhaust or otherwise dispense the exhaust gas generated from the engine from the vehicle. The exhaust manifold 12 can include any suitable component such as, but not limited to, filters, catalytic converters, pipes, ducts, or any combination thereof.

The rod 16 extends between a first distal end 26 and a second distal end 28. The rod 16 is any suitable rod 16. As a non-limiting example, the rod 16 can be a solid rod or a hollow rod (e.g., a hollow tube). At least a portion of the rod 16 is operably coupled to a portion exterior the exhaust system 10. As a non-limiting example, the rod 16 is operably coupled to a frame of a vehicle through an isolator 32. The isolator 32 can be any suitable isolator such as, but not limited to, a rubber isolator. A stop 30 is provided along a portion of the rod 16. As a non-limiting example, the stop 30 is provided between the isolator 32 and a fin 20. The stop 30 impedes the isolator 32 such that the isolator 32 cannot contact the fin 20 or any other portion of the hanger assembly 14 on an opposite side of the stop 30 as the isolator 32.

The flange 18 includes a body defining an interior 24. The flange 18 is sized to fit along a portion of the exhaust manifold 12. The flange 18 is operably coupled to or otherwise integrally formed with the exhaust manifold 12. The flange 18 can be any suitable shape or size. As illustrated, the flange 18 can be generally cubicle with a curved bottom, a hollow interior, and an opening long one face.

A slot 22 is formed by or otherwise along the flange 18. As a non-limiting example, the slot 22 can be formed within the flange 18 on opposing sides of the body of the flange 18. The slot 22 can be open to the interior 24 of the flange 18. As such, the slot 22 forms a channel into the interior 24 of the flange 18. The slot 22 can be any suitable size or shape. The slot 22 is sized to accept a corresponding portion of the fin 20. The fin 20, when received within the slot 22, at least partially extends through the interior 24 of the flange 18.

The rod 16 is operably coupled to the fin 20. The rod 16 and the fin 20 are operably coupled to one another through any suitable method such as, but not limited to, welding, adhesion, or fastening. The fin 20 is received within the slot 22 and operably coupled to a corresponding portion of the flange 18 that defines the slot 22. The fin 20 and the flange 18 are operably coupled to one another through any suitable method such as, but not limited to, welding, adhesion, or fastening.

Figure 2:
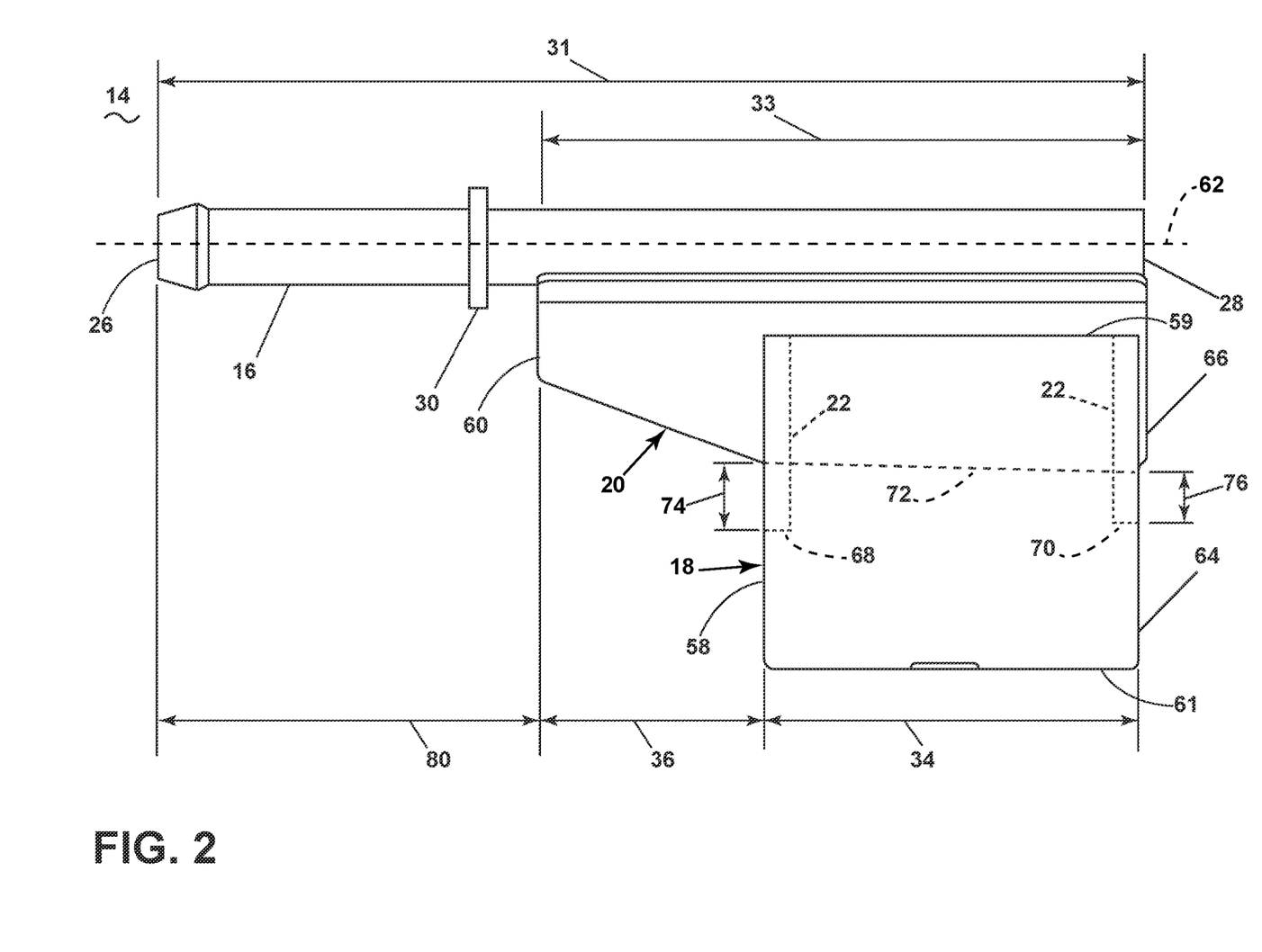
FIG. 2 is a side view of the hanger assembly of FIG. 1, further comprising a rod, a flange, and a fin.

FIG. 2 is a side view of the hanger assembly 14 of FIG. 1. The fin 20, as illustrated, is received within the slot 22.

The rod 16 extends along a rod centerline 62. The rod centerline 62 can extend linearly or non-linearly along a length of the rod 16. The rod 16 extends axially along the rod centerline 62 a first length 31.

The fin 20 extends axially between a fin forward face 60 and a fin aft face 66, with respect to the rod centerline 62. The fin 20 includes a lower face 72 (illustrated in phantom lines), which extends into the interior 24 of the flange 18. The lower face 72 is a radial termination of the fin 20 with respect to the rod centerline 62. As illustrated, the lower face 72 extends at an angle with respect to the rod centerline 62. It will be appreciated that the lower face 72 can be angled with respect to or parallel to the rod centerline 62. It will be further appreciated that that the lower face 72 can extend linearly or non-linearly. The fin 20 extends axially along the rod centerline 62 a second length 33.

The flange 18 extends axially between a flange forward face 58 and a flange aft face 64, with respect to the rod centerline 62. The flange 18 extends axially along the rod centerline 62 a third length 34. The flange 18 further includes an upper face 59 and a lower face 61 radially spaced from the upper face 59, with respect to the rod centerline 62. When mounted to the exhaust manifold 12, the lower face 61 confronts a corresponding portion of the exhaust manifold 12. The upper face 59 and the lower face 61 are each radially spaced from the rod centerline 62. At least a portion of the fin 20 extends into the interior of the flange 18. A remaining portion of the fin 20 extends radially beyond or vertically beyond the upper face 59 of the flange 18.

While illustrated as a cubical or rectangular shape with a hollow (e.g., the interior 24), it will be appreciated that the flange 18 can take any suitable form. As a non-limiting example, the flange 18 can be discontinuous such that it is formed by two discrete bodies spaced from one another to define a space or the interior 24 therebetween. As a non-limiting example, the walls interconnecting the flange forward face 58 and the flange aft face 64 can be excluded from the flange 18 such that the flange forward face 58 and the flange aft face 64 form two separate bodies that together define the flange 18. The space between the body having the flange forward face 58 and the body having the flange aft face 64 define the interior 24 of the flange 18 through which the fin 20 extends through.

The slot 22, which extends through the flange forward face 58 and the flange aft face 64, includes a forward termination 68 and an aft termination 70, each being defined as a farthest radial point of the respective portion of the slot 22 with respect to the rod centerline 62. For purposes of illustration, the forward termination 68 and the aft termination 70 have each been illustrated in phantom lines.

The first length 31 is larger than the second length 33. The second length 33 is larger than the third length 34. As the second length 33 is larger than the third length 34, a portion of the fin 20 extends axially past the body of the flange 18, with respect to the rod centerline 62.

The flange forward face 58 and the flange aft face 64 can be axially spaced, with respect to the rod centerline 62, a first distance 36 from the fin forward face 60 or the fin aft face 66, respectively. As illustrated, the first distance 36 is formed between the fin forward face 60 and the flange forward face 58, however, it will be appreciated that the first distance 36 can be formed between the fin aft face 66 and the flange aft face 64 or between both the fin aft face 66 and the flange aft face 64, and the fin forward face 60 and the flange forward face 58. Alternatively, the fin forward face 60 can correspond to the flange forward face 58, or the fin aft face 66 can correspond to the flange aft face 64. The first distal end 26 of the rod 16 is axially spaced, with respect to the rod centerline 62, from the fin forward face 60 a second distance 80. The second distal end 28 can sit flush with or be offset from (e.g., axially forward or away from with respect to the rod centerline 62) the fin aft face 66.

The forward termination 68 is spaced a first height 74 from a radially adjacent portion of the lower face 72, with respect to the rod centerline 62. The aft termination 70 is spaced a second height 76 from a radially adjacent portion of the lower face 72, with respect to the rod centerline 62. The first height 74 can be larger than, smaller than, or equal to the second height 76.

It is contemplated that the first height 74, the second height 76, the first distance 36 and the second distance 80 can be varied based on the environment that the hanger assembly 14 is provided within. In other words, the first height 74, the second height 76, the first distance 36 and the second distance 80 can be varied such that the rod 16 is couplable to any suitable existing portion of the environment that the exhaust system 10 is being mounted within (e.g., to a frame of a vehicle).

Figure 3:
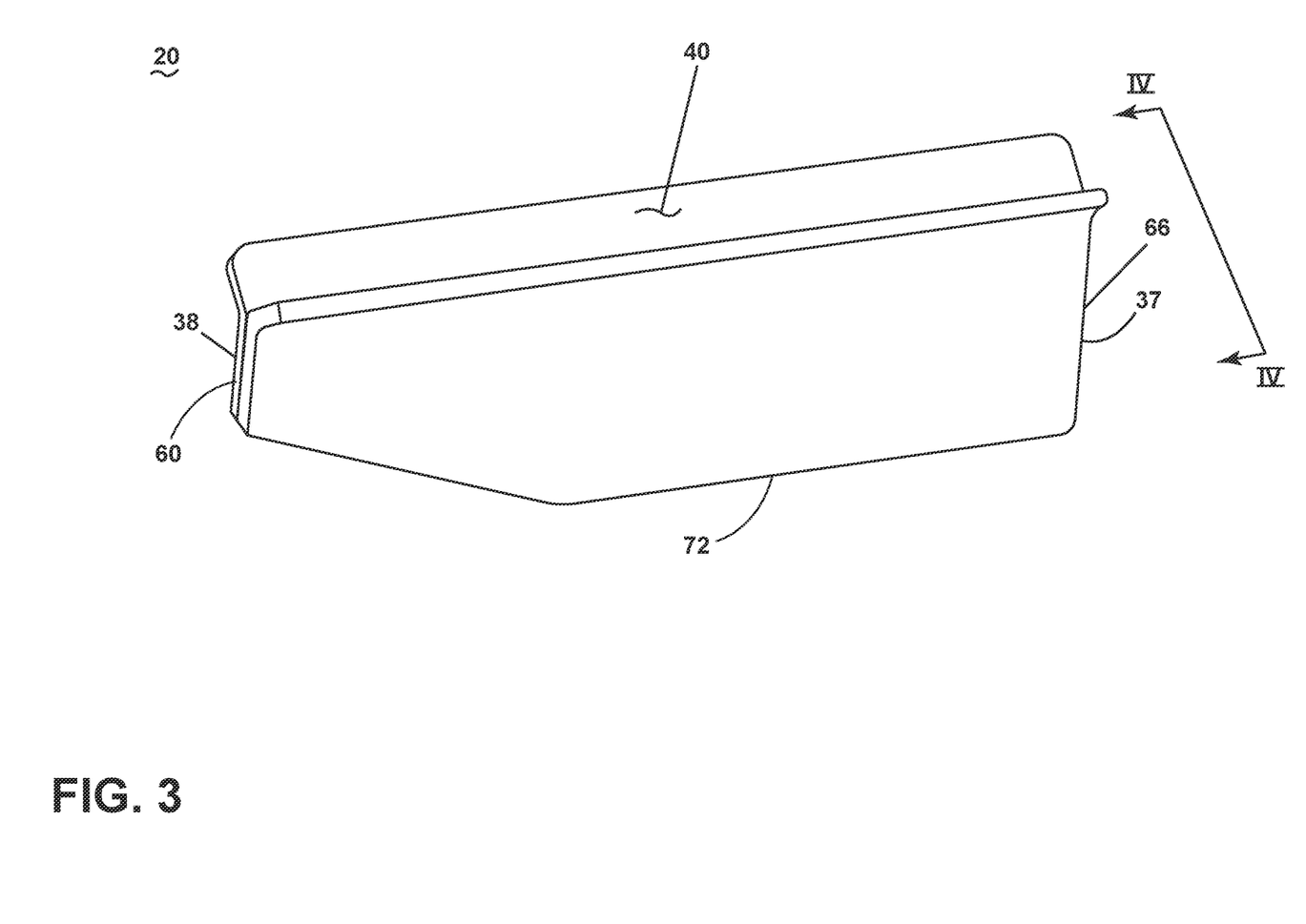
FIG. 3 is a top-down perspective view of the fin of FIG. 2 removed from a remainder of the hanger assembly, the fin further comprising a first leg, a second leg and a seat.

FIG. 3 is a top-down perspective view of the fin 20 of FIG. 2 removed from a remainder of the hanger assembly 14. The fin 20 can be made up of at least two discrete components that are coupled to one another through a variety of suitable methods such as, but not limited to, adhesion, welding, or fastening. The fin 20 can include a first leg 37 and a second leg 38.

Both the first leg 37 and the second leg 38 include a respective fin forward face 60, fin aft face 66 and lower face 72. The fin forward face 60, the fin aft face 66 and the lower face 72 of the first leg 37 corresponds to or are offset from the fin forward face 60, the fin aft face 66 and the lower face 72, respectively, of the second leg 38.

The fin 20 includes a seat 40. As a non-limiting example, the first leg 37 and the second leg 38 join together to form the seat 40. The seat 40 is provided along a radially opposing end of the fin 20 from the lower face 72 with respect to the rod centerline 62. As illustrated, the seat 40 can be defined by a planar portion of first leg 37 and the second legs 38 extending in opposite directions. It should be recognized that the planar portions defining the seat could be planar or curved to accommodate a circumference of the rod 16.

Figure 4:
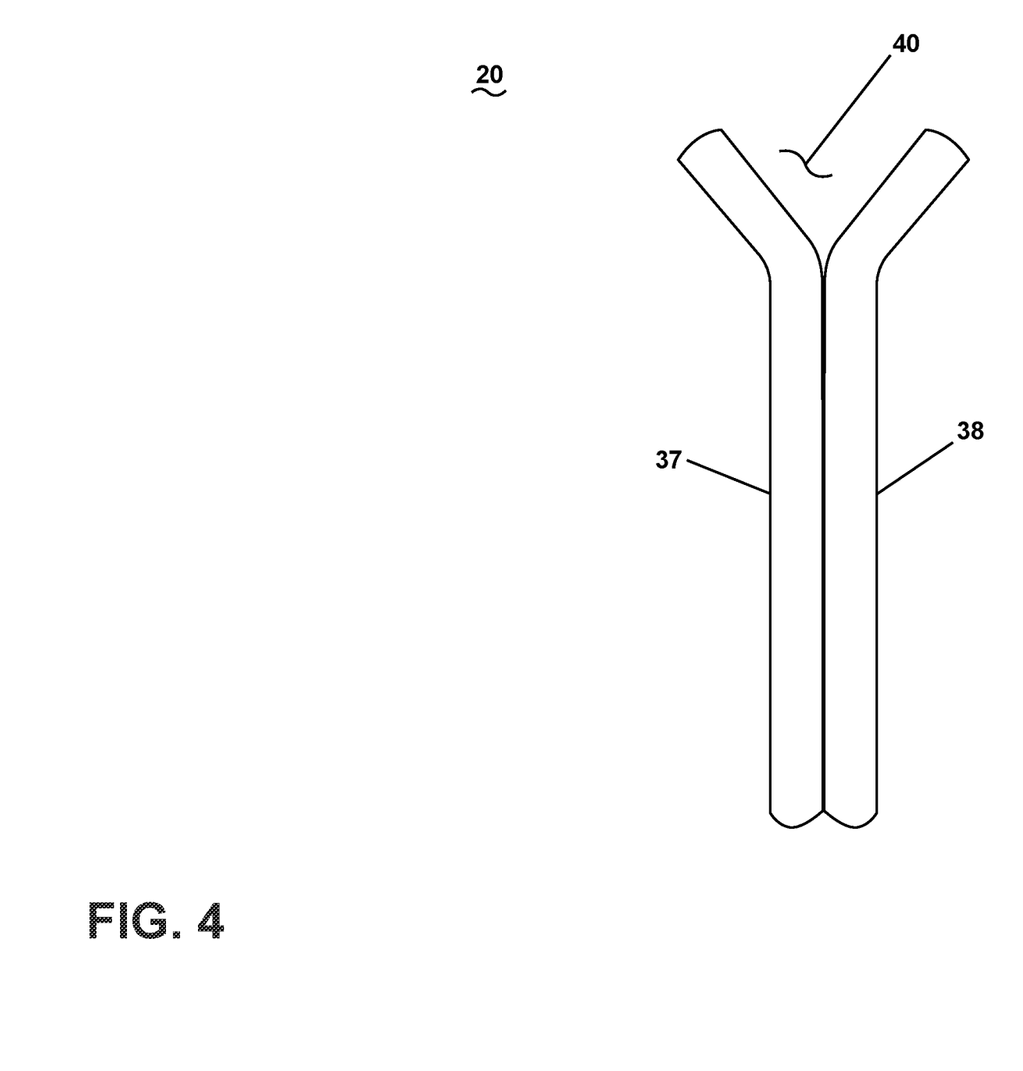
FIG. 4 is a back-front view of the fin as seen from sight line IV-IV of FIG. 3.

FIG. 4 is a back-front view of the fin 20 as seen from sight line IV-IV of FIG. 3. The fin 20 can include any suitable shape or cross section when the first leg 37 and the second leg 38 are coupled to one another. As a non-limiting example, the fin 20 can form a Y-shaped cross-sectional area when viewed along a vertical plane perpendicular to the rod centerline 62 and intersecting the fin 20. The top of the Y or the V-shaped portion of the Y defines the seat 40. It will be appreciated that the fin 20 can have any suitable cross-sectional area that defines the seat 40.

As discussed, when provided within a vehicle, the isolator 32 mounts the rod 16, and hence the hanger assembly 14 and the exhaust manifold 12 to a frame of the vehicle. The isolator 32 is made of a silicone or rubber and is used to effectively dampen the vibrations from the frame. Some vibrations, however, can translate through the isolator 32 and into the hanger assembly 14. It is contemplated that it is beneficial to ensure that the hanger assembly 14 can withstand the vibrations transmitted through the isolator 32. Further, it is contemplated that it is beneficial to ensure that the hanger assembly 14 can have a natural frequency at which it resonates or an eigenfrequency. The hanger assembly 14 is constructed such that it has a relatively high eigenfrequency with respect to the frequency of the vibrations transmitted through the isolator 32. As a non-limiting example, the hanger assembly 14 is constructed such that it can withstand vibrations of greater than or equal 600 Hz. As a non-limiting example, some engines can operate up to 6000 RPM, which generates a frequency of 400 Hz. The hanger assembly 14 is able to withstand the 400 Hz frequency. Most frames in a vehicle will have a frequency of As the hanger assembly 14 has a relatively high eigenfrequency or is otherwise able to withstand high frequencies, the hanger assembly 14 can be applied to a multitude of engines and vehicles with frames resonating at a wide range of frequencies.

Figure 5:
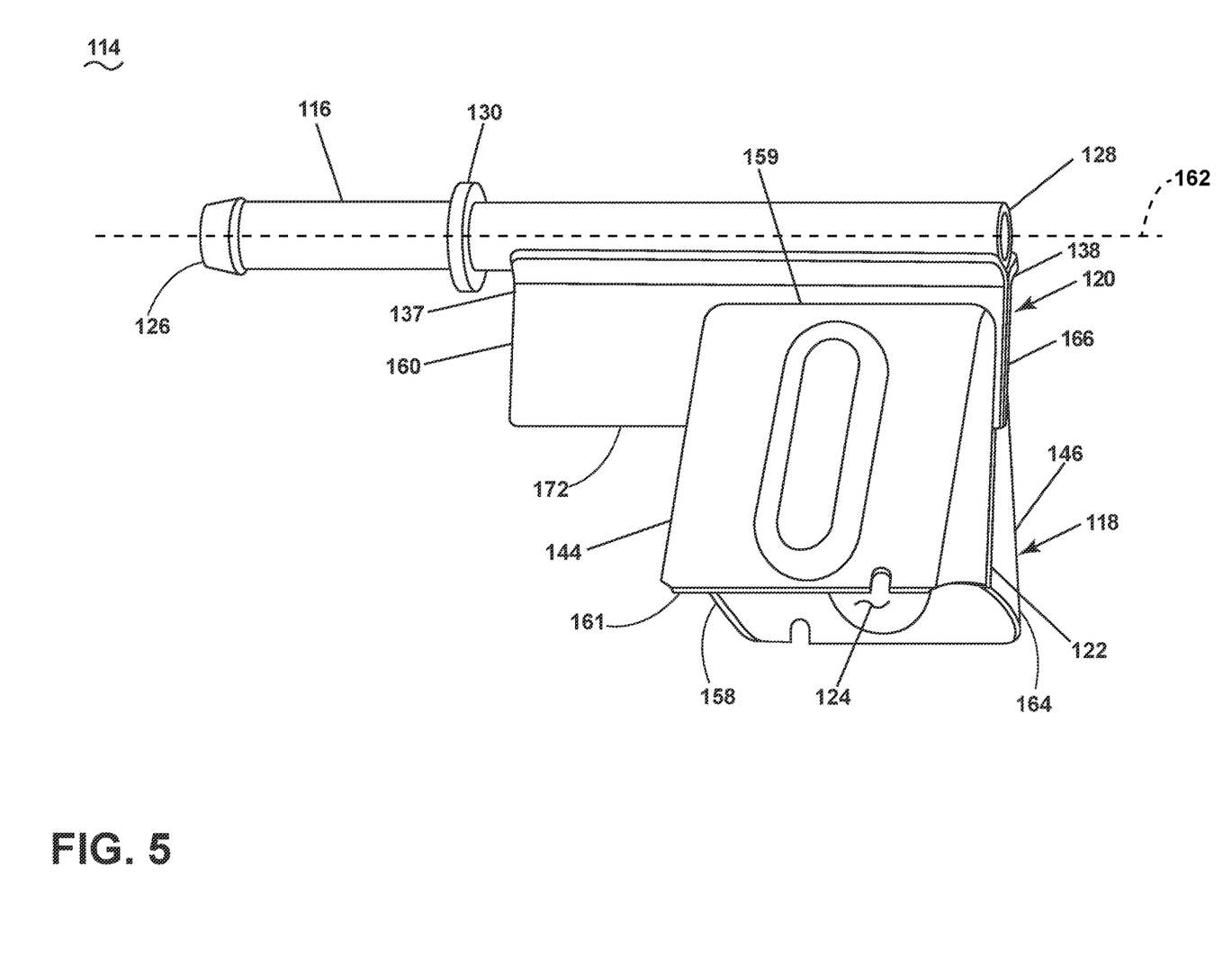
FIG. 5 is bottom-up perspective view of an exemplary hanger assembly suitable for use as the hanger assembly of FIG. 1, the hanger assembly further comprising a flange with a first body and a second body.

FIG. 5 is bottom-up perspective view of an exemplary hanger assembly 114 suitable for use as the hanger assembly 14 of FIG. 1. The hanger assembly 114 is similar to the hanger assembly 14, therefore, like parts will be identified with like numerals increased to the 100 series, with it being understood that the description of the like parts of the hanger assembly 14 applies to the hanger assembly 114 unless otherwise noted.

The hanger assembly 114 includes a rod 116, a flange 118 with a slot 122, and a fin 120. The rod 116 is defined by a rod centerline 162. The rod 116 terminates at a first distal end 126 and a second distal end 128 axially spaced, with respect to the rod centerline 162, from the first distal end 126. A stop 130 is provided along the rod 116 prior to the first distal end 126. The flange 118 extends axially between a flange forward face 158 and a flange aft face 164, with respect to the rod centerline 162. The flange 118 further extends radially between an upper face 159 and a lower face 161, with respect to the rod centerline 162. At least a portion of the fin 120 extends radially beyond (e.g., radially towards) the upper face 159 with respect to the rod centerline 162. The flange 118 includes a body that defines an interior 124. The fin 120 extends axially between a fin forward face 160 and a fin aft face 166. The fin 120 terminates at a radially distal end or a lower face 172, with respect to the rod centerline 162. The fin 120 includes a first leg 137 and a second leg 138.

The fin 120 is similar to the fin 20, except that the fin 120 is a rectangular fin when viewed along a vertical plane extending along the rod centerline 162. In other words, the lower face 172 is not angled and extends at a right angle with respect to the fin forward face 160 and the fin aft face 166.

The flange 118 is similar to the flange 18, except that the flange 118 is formed as a generally triangular shape and does not include an open top. Further, the flange 118 is discontinuous. The flange 118 includes a first body 144 and a second body 146, that together make the body of the flange 118. The first body 144 and the second body 146, collectively, define the interior 124. As illustrated, the first body 144 and the second body 146 are spaced from each other to defined a space therebetween. The space defines the slot 122. The slot 122 runs along an entirety of or a portion of the radial extent of the flange 118, with respect to the rod centerline 162. The slot 122 at radially distal ends with respect to the rod centerline 162. As a non-limiting example, the slot 122 terminates along a forward radial termination and an aft radial termination, which coincides with where the hanger assembly 114 meets the exhaust manifold (not illustrated). The lower face 172 of the fin 120 is provided a radial height or distance from the forward radial termination and the aft radial termination.

Figure 6:
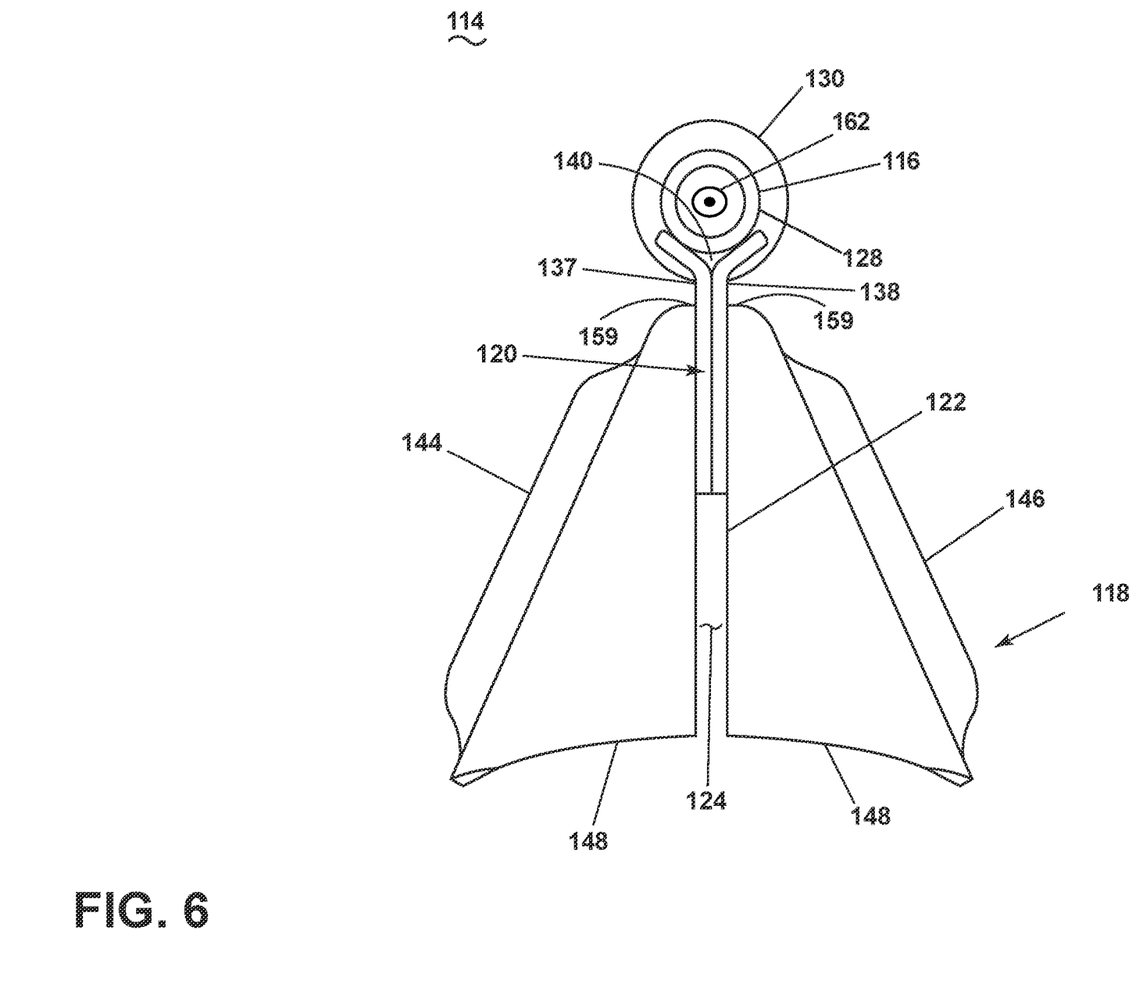
FIG. 6 is a back-front view of the hanger assembly of FIG. 5, further comprising a fin with a first leg and a second leg.

FIG. 6 is a back-front view of the hanger assembly 114 of FIG. 5. At least a portion of both the first leg 137 and the second leg 138 extend into the slot 122. The first leg 137 and the second leg 138, together, form a seat 140 that the rod 116 is couplable within.

The lower face 161 of the flange 118 is further defined by a curvature 148. The curvature 148 is sized according to a portion of the exhaust manifold (e.g., the exhaust manifold 12) that the hanger assembly 114 will be coupled to. As a non-limiting example, lower face 161 can include any shape such that the lower face 161 of the flange 118 sits flush against a corresponding portion of the exhaust manifold.

Figure 7:
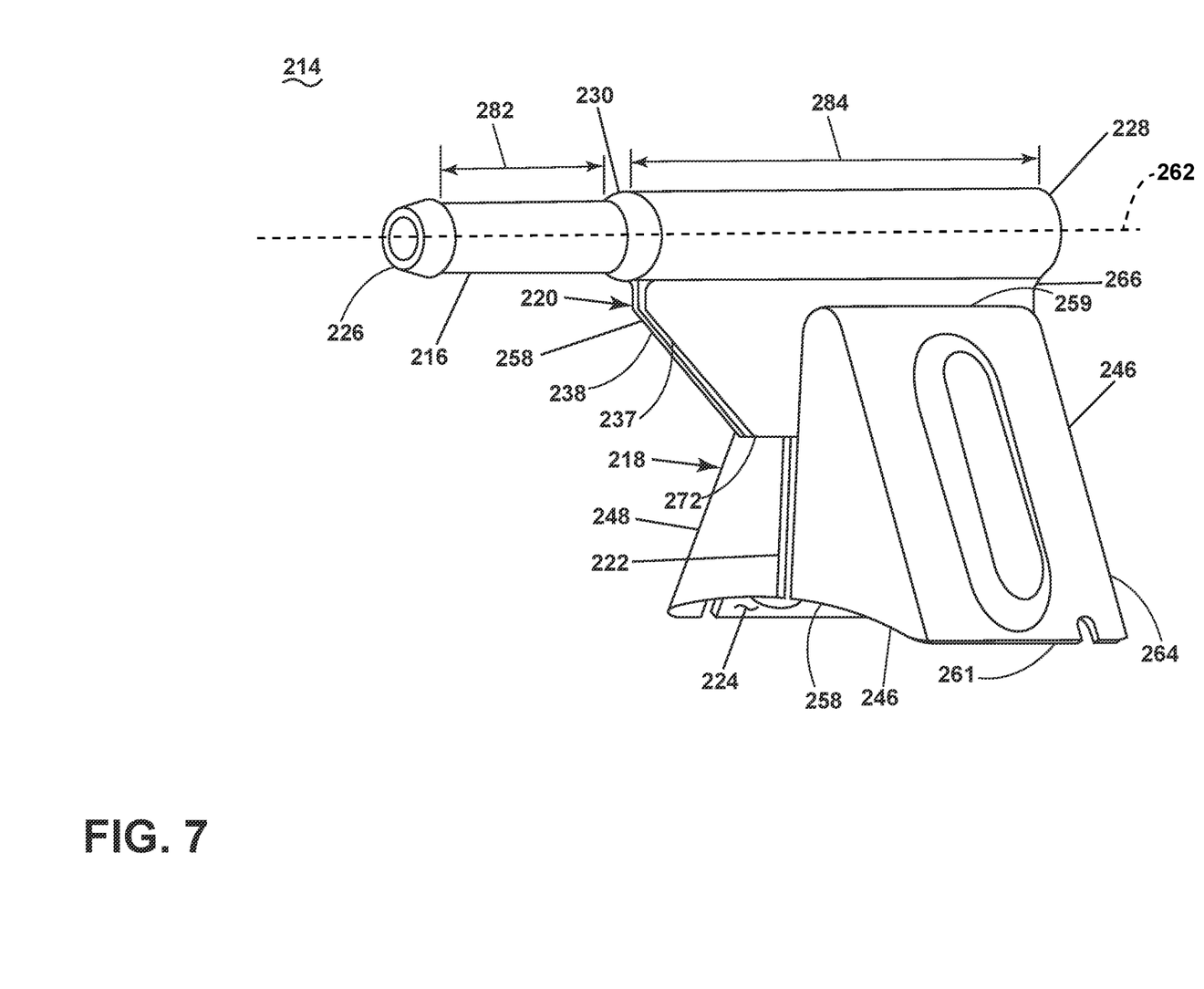
FIG. 7 is a front perspective view of an exemplary hanger assembly suitable for use as the hanger assembly of FIG. 1, the hanger assembly further comprising a fin and a rod integrally formed with one another.

FIG. 7 is a front perspective view of an exemplary hanger assembly 214 suitable for use as the hanger assembly 14 of FIG. 1. The hanger assembly 214 is similar to the hanger assembly 14, 114, therefore, like parts will be identified with like numerals increased to the 200 series, with it being understood that the description of the like parts of the hanger assembly 14, 114 applies to the hanger assembly 214 unless otherwise noted.

The hanger assembly 214 includes a rod 216, a flange 218 with a slot 222, and a fin 220. The rod 216 is defined by a rod centerline 262. The rod 216 terminates at a first distal end 226 and a second distal end 228 axially spaced, with respect to the rod centerline 262, from the first distal end 226. A stop 230 is provided along the rod 216 prior to the first distal end 226. The flange 218 extends axially between a flange forward face 258 and a flange aft face 264, with respect to the rod centerline 262. The flange 218 further extends radially between an upper face 259 and a lower face 261, with respect to the rod centerline 162. At least a portion of the fin 220 extends radially beyond (e.g., radially towards) the upper face 259 with respect to the rod centerline 262. The flange 218 includes a body that defines an interior 224. The fin 220 extends axially between a fin forward face 260 and a fin aft face 266. The fin 220 terminates at a radially distal end or a lower face 272, with respect to the rod centerline 262. The fin 220 includes a first leg 237 and a second leg 238. The slot 222 at radially distal ends with respect to the rod centerline 262. As a non-limiting example, the slot 222 terminates along a forward radial termination and an aft radial termination, which coincides with where the hanger assembly 114 meets the exhaust manifold (not illustrated). The lower face 272 of the fin 220 is provided a radial height or distance from the forward radial termination and the aft radial termination.

The flange 218 is similar to the flange 118 in that it includes a first body 244 and a second body 246 that together define the interior 224. The lower face 261 includes a curvature 248 sized to sit flush against the exhaust manifold.

The hanger assembly 214 is similar to the hanger assembly 14, 114, except that at least two of the rod 216, the flange 218 and the fin 220 are integrally formed with one another. As a non-limiting example, the rod 216 and the fin 220 are integrally formed with one another. As a non-limiting example, the stop 230 is integrally formed with the rod 216. The first area 282 extends axially, with respect to the rod centerline 262, between the stop 230 and a portion of the rod 216 defining the first distal end 226. The second area 284 extends axially, with respect to the rod centerline 262, between the stop 230 and a portion of the rod 216 axially opposite the first distal end 226. The first area 282 and the second area 284 are each defined by a respective cross-sectional area when viewed along a vertical plane perpendicularly to the rod centerline 262 and intersecting the first area 282 and the second area 284, respectively. The cross-sectional area of the first area 282 differs from or is equal to the cross-sectional area of the second area 284. As a non-limiting example, the cross-sectional area of the first area 282 is smaller than the cross-sectional area of the second area 284. The stop 230 defines a portion of the rod 216 in which the cross-sectional area of the rod 216 diverges from the cross-sectional area of the first area 282 or the second area 284. As illustrated, the stop 230 defines a transition between the first area 282 and the second area 284.

Figure 8:
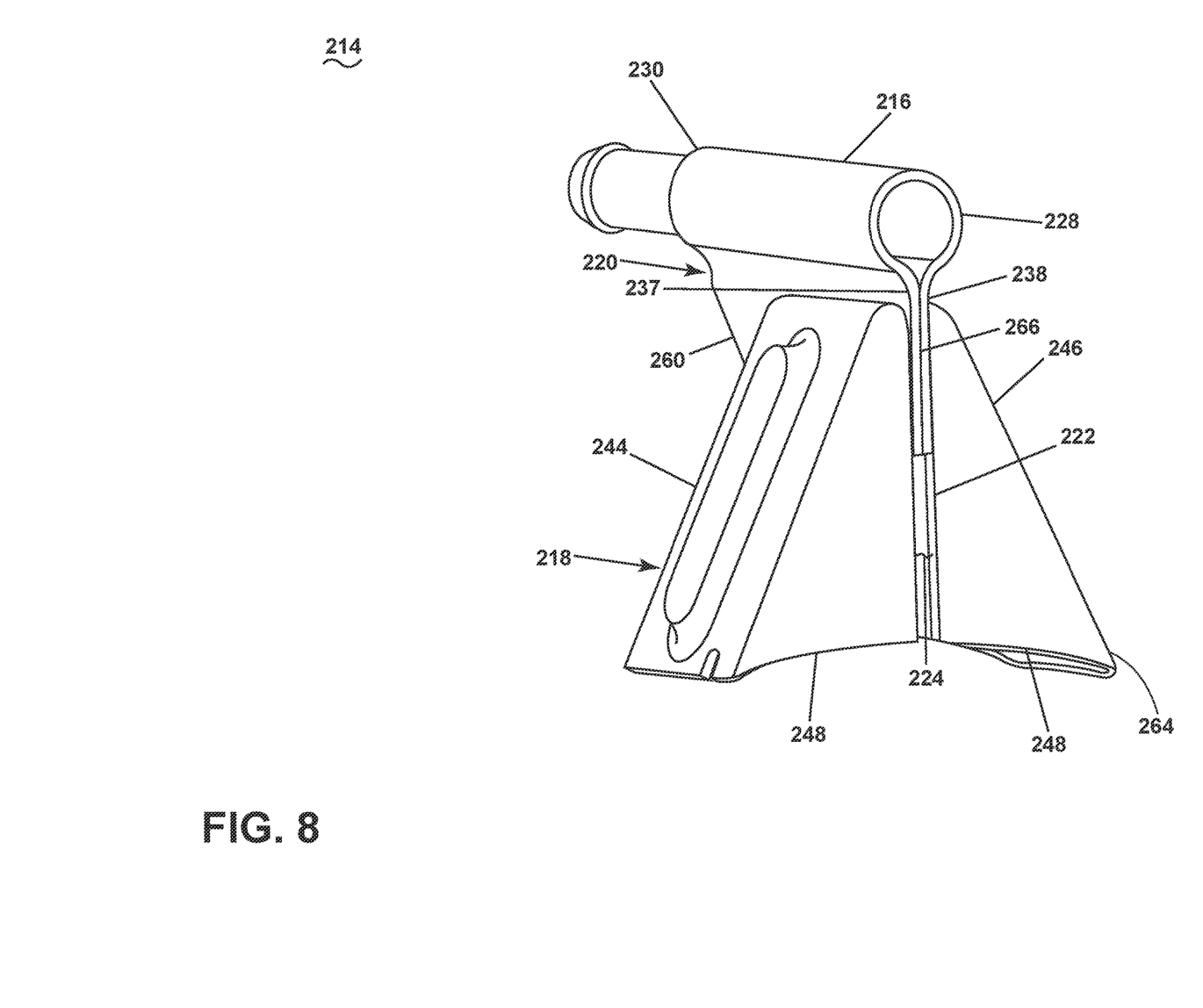
FIG. 8 is a rear perspective view the hanger assembly of FIG. 7, further illustrating the integral formation of the rod and the fin.

FIG. 8 is a rear perspective view of the hanger assembly 214 of FIG. 7. The rod 216 and the fin 220 are integrally formed. As illustrated, the first leg 237 and the second leg 238 of the fin 220 each extend from respective portions of the rod 216. It is contemplated that the rod 216 and the fin 220 can be formed as illustrated, or as a flattened piece of sheet material that is folded into what is illustrated.

The benefit of using the hanger assembly 214, rather than the hanger assembly 14, 114 is that the hanger assembly 214 eliminates points of coupling, between components of the hanger assembly 214. This ultimately increases the strength of the hanger assembly 214, with respect to The hanger assembly 14, 114 as points of coupling (e.g., welds) act as points of decreased strength with respect to a remainder of the hanger assembly. The hanger assembly 214, instead, includes integrally formed components that do not require additional coupling. In other words, at least two or more portions of the hanger assembly 214 are formed as a unitary body that does not include points of coupling (e.g., welds, fastenings, etc.).

Figure 9:
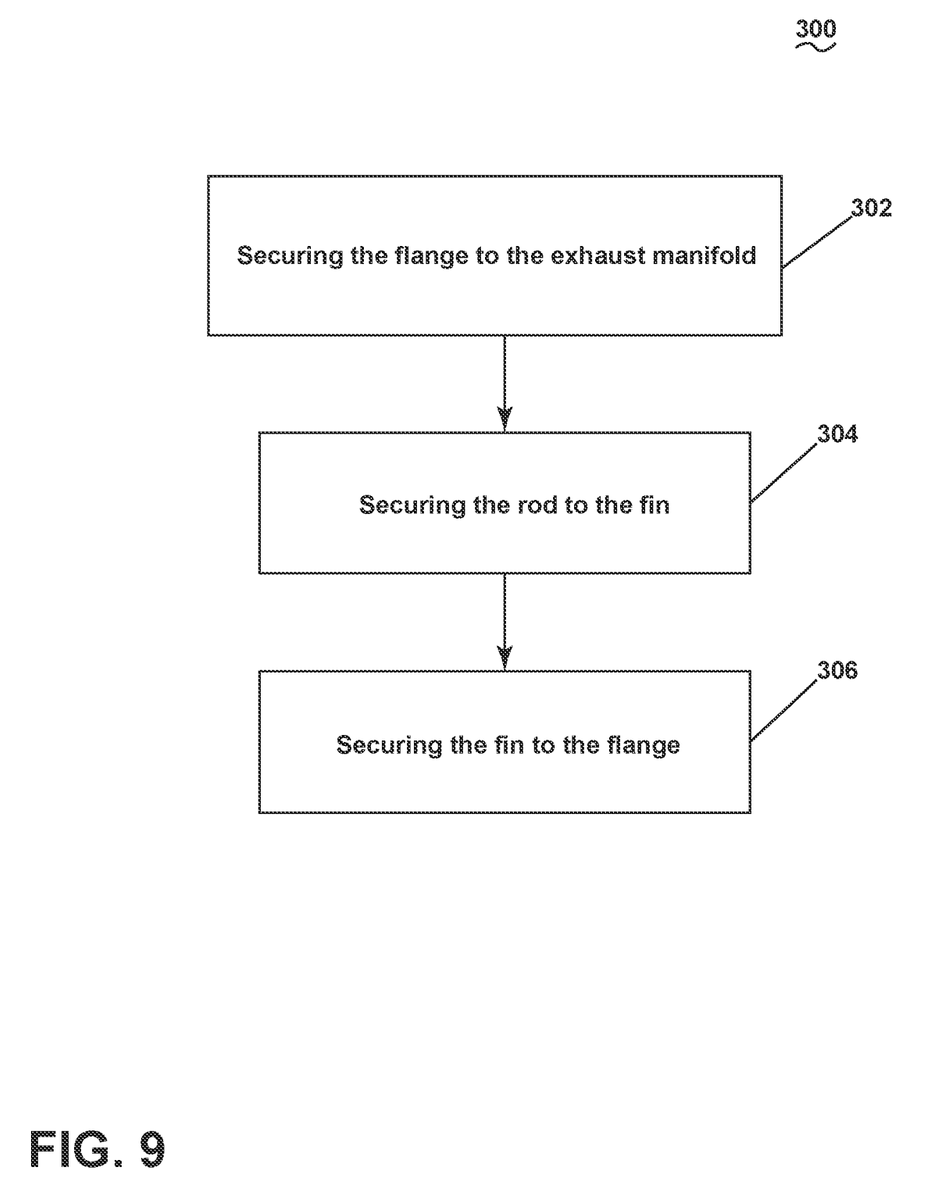
FIG. 9 is a method of assembling the hanger assembly of FIG. 1.

FIG. 9 is a method 300 of assembling the hanger assembly 14 of FIG. 1. While described in terms of the hanger assembly 14, it will be appreciated that the method 300 is applicable to any of the hanger assemblies 14, 114, 214 described herein.

The method 300 includes securing the flange 18 to an exterior portion of the exhaust manifold 12, at 302. The rod 16 is secured to the fin 20, at 304. The fin 20 is secured to the flange 18, at 306. As a non-limiting example, at least one of the first leg 37 or the second leg 38 is secured to the flange 18 within the slot 22. As discussed herein, the securing or coupling of any of the portions of the hanger assembly 14 can be done through a variety of suitable methods.

The sequences depicted is for illustrative purposes only and is not meant to limit the method 300 in any way as it is understood that the portions of the method can proceed in a different logical order, additional or intervening portions can be included, or described portions of the method can be divided into multiple portions, or described portions of the method can be omitted without detracting from the described method. For example, the method 300 can include various other intervening steps. The examples provided herein are meant to be non-limiting.

For example, the method 300 can include positioning the fin 20 within the slot 22 of the flange 18. The positioning of the fin 20 is done by adjusting the first height 74, the second height 76 and the first distance 36 such that the rod 16 can be operably coupled to any suitable portion of the environment that the hanger assembly 14 is provided within. Once the first height 74, the second height 76 and the first distance 36 are selected (e.g., the fin 20 is positioned within the slot 22 such that it is couplable to a portion of the surrounding environment), the first leg 37 and/or the second leg 38 can then be secured or otherwise coupled to a corresponding portion of the slot 22 or flange 18. The method 300 can further include coupling the hanger assembly 14 to a surrounding portion of the environment. As a non-limiting example, the method 300 can include coupling the rod 16 to a frame of a vehicle via the isolator 32.

As another example, the method 300 can include securing the first leg 37 to the second leg 38. The securing of the first leg 37 to the second leg 38 can be done through any suitable coupling method such as, but not limited to, welding, adhesion, or fastening.

As another example, the method 300 can include forming, as a unitary body, at least two of the rod 16, the fin 20, and the flange 18. The method 300 can include forming, as a unitary body, the rod 16 and the fin 20. The method 300 can include forming, as a unitary body and a sheet of material, the rod 16 and the fin 20. The sheet of material can be folded or otherwise rolled into the shape of the rod 16 and the fin 20.

Benefits of the present disclosure include a more robust hanger assembly compared to a conventional hanger assembly. For example, the conventional hanger assembly includes a flange and a rod extending directly from the flange. As the rod extends from the flange and a distal portion of the flange is coupled to the frame (e.g., through the isolator) a moment is experienced across the rod. The moment is defined as a force across the rod and to the flange. This design, while accomplishing the objectives of the hanger assembly, is prone to breaking due to the forces experienced across the rod when mounting the exhaust manifold to the frame of a vehicle. The hanger assembly, as described herein, however, includes the rod, which is mounted to or integrally formed with the fin, which is coupled to the flange. The fin extends at least partially axially beyond the flange with respect to the rod centerline. This extension of the fin results in a reduction of the moment experienced across the rod. This, in turn, reduces the forces experienced along the hanger assembly with respect to the conventional hanger assembly. The reduction of forces ultimately results in a more robust hanger assembly with a longer lifespan and resilience to forces when compared to the conventional hanger assembly.

Further, the conventional hanger assembly is designed for a specific exhaust system, vehicle and location along the exhaust manifold. Specifically, the conventional hanger assembly is designed with an adequate eigenfrequency such that the conventional hanger assembly will not fail where it is placed. This means, however, that multiple hanger assemblies must be designed for a single exhaust system. The hanger assembly, as described herein, however, has a much higher eigenfrequency, and is therefore much more robust, when compared to the conventional hanger assembly. This, in turn, means that a single design for the hanger assembly can be sued for the entirety of the exhaust system.

Further benefits of the present disclosure include a more versatile hanger assembly when compared to the conventional hanger assembly. For example, as disused above, multiple hanger assemblies must be designed in order to fit the hanger assembly to the location it is provided on along the exhaust system. The rod may be formed longer or the frame larger to ensure that the rod can be coupled to the frame. The hanger assembly, as described herein, however, includes the fin, which is received within the slot. When assembling the hanger assembly, the fin is positioned within the slot such that that the rod is provided at a preferred position based on the location where it is being mounted (e.g. through the selection of the first height, the second height and the first distance). Once the fin is provided within the correct spot, the fin is coupled to the flange to retain the rod within the selected position. This, in turn, means that the hanger assembly can be fit to a multitude of exhaust systems along any suitable location of the exhaust system. In other words, only a single hanger assembly needs to be designed to fit across multiple exhaust systems or locations within a single exhaust system. This ultimately results in a much more versatile hanger assembly when compared to the conventional hanger assembly.

To the extent not already described, the different features and structures of the various aspects can be used in combination with each other as desired. That one feature cannot be illustrated in all of the aspects is not meant to be construed that it cannot be, but is done for brevity of description. Thus, the various features of the different aspects can be mixed and matched as desired to form new aspects, whether or not the new aspects are expressly described. Combinations or permutations of features described herein are covered by this disclosure.

This written description uses examples to describe aspects of the disclosure described herein, including the best mode, and also to enable any person skilled in the art to practice aspects of the disclosure, including making and using any devices or systems and performing any incorporated methods. The patentable scope of aspects of the disclosure is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An exhaust system comprising:
    an exhaust manifold; and
    a hanger assembly operably coupled to the exhaust manifold, the hanger assembly comprising:
        a rod defining a rod centerline;
        a flange having an upper face, a lower face, an interior and a slot, with the lower face being radially spaced from the upper face, with respect to the rod centerline, and being operably couplable to a respective portion of the exhaust manifold; and
        a fin at least partially received within the slot and extending through at least a portion of the interior, the fin being operably coupled to the rod, with at least a portion of the fin extending radially beyond the upper face of the flange and toward the rod centerline with respect to the rod centerline;
        wherein the flange extends a first axial distance along the rod centerline and the fin extending a second axial distance along the rod centerline.

2. The exhaust system of claim 1, wherein the flange is discontinuous and comprises a first body and a second body, each having a respective wall that collectively define the interior.

3. The exhaust system of claim 1, wherein the flange comprises a first body and a second body, with the first body and the second body being spaced apart from one another to define the slot therebetween.

4. The exhaust system of claim 3, wherein the fin is at least partially received within the slot.

5. The exhaust system of claim 4, wherein the fin comprises a leg and a seat, with the leg being at least partially provided within the slot and coupled to at least one of the first body or the second body.

6. The exhaust system of claim 5, wherein the rod is operably coupled to the seat.

7. The exhaust system of claim 5, wherein the seat is radially inward from the upper surface with respect to the rod centerline.

8. The exhaust system of claim 1, wherein the fin comprises a leg and a seat with the seat being operably coupled to the rod and the leg being operably coupled to at least a portion of the flange.

9. The exhaust system of claim 1, wherein the first axial distance is smaller than the second axial distance.

10. The exhaust system of claim 1, wherein the fin comprises a Y-shaped cross-section when viewed along a vertical plane perpendicular to the rod centerline and intersecting the fin.

11. The exhaust system of claim 1, further comprising an isolator operably coupled to the rod, wherein the rod is spaced axially, with respect to the rod centerline, from an axial start of the fin.

12. The exhaust system of claim 11, wherein a stop is provided along the rod axially between the isolator and the fin.

13. A method of mounting an exhaust system having an exhaust manifold and a hanger assembly mounted to the exhaust manifold, the method comprising:
  securing a flange of the hanger assembly to a corresponding portion of the exhaust manifold, the flange having a body defining an interior;
  securing a rod of the hanger assembly to a fin of the hanger assembly, the fin having a leg and a seat extending from the leg; and
  securing the leg of the fin to a corresponding portion of the flange such that the fin extends through at least a portion of the interior.

14. The method of claim 13, wherein the flange comprises a first body and a second body, each having a respective wall that collectively define the interior, and the method further comprises:
  spacing the first body from the second body such that a slot is formed therebetween; and
  positioning the leg of the fin at least partially within the slot.

15. An exhaust system comprising:
an exhaust manifold; and
a hanger assembly operably coupled to the exhaust manifold, the hanger assembly comprising:
  a rod defining a rod centerline;
  a flange having an upper face, a lower face, an interior and a slot, with the lower face being radially spaced from the upper face, with respect to the rod centerline, and being operably couplable to a respective portion of the exhaust manifold; and
  a fin at least partially received within the slot and extending through at least a portion of the interior, the fin being operably coupled to the rod, with at least a portion of the fin extending radially beyond the upper face of the flange and toward the rod centerline with respect to the rod centerline;
  an isolator operably coupled to the rod, wherein the rod is spaced axially, with respect to the rod centerline, from an axial start of the fin; and
  a stop integrally formed with the rod and provided along the rod axially between the isolator and the fin.

16. The exhaust system of claim 15, wherein the flange is discontinuous and comprises a first body and a second body, each having a respective wall that collectively define the interior.

17. The exhaust system of claim 15, wherein the flange comprises a first body and a second body, with the first body and the second body being spaced apart from one another to define the slot therebetween.

18. The exhaust system of claim 17, wherein the fin is at least partially received within the slot.

19. The exhaust system of claim 15, wherein the flange extends a first axial distance along the rod centerline and the fin extending a second axial distance along the rod centerline.

20. The exhaust system of claim 19, wherein the first axial distance is smaller than the second axial distance.

* * * * *